United States Patent
Anderson

(10) Patent No.: US 11,934,582 B1
(45) Date of Patent: Mar. 19, 2024

(54) PORTABLE HAPTIC SYSTEMS FOR USE WITHIN A VENUE

(71) Applicant: MSG Entertainment Group, LLC, New York, NY (US)

(72) Inventor: Robert Anderson, Levittown, NY (US)

(73) Assignee: MSG Entertainment Group, LLC, New York, NY (US)

( * ) Notice: Subject to any disclaimer, the term of this patent is extended or adjusted under 35 U.S.C. 154(b) by 0 days.

(21) Appl. No.: 17/988,474

(22) Filed: Nov. 16, 2022

(51) Int. Cl.
G06F 3/048 (2013.01)
A61G 5/10 (2006.01)
G06F 3/01 (2006.01)

(52) U.S. Cl.
CPC .............. *G06F 3/016* (2013.01); *A61G 5/10* (2013.01)

(58) Field of Classification Search
CPC .................................. G06F 3/016; A61G 5/10
See application file for complete search history.

(56) References Cited

U.S. PATENT DOCUMENTS

| | | | |
|---|---|---|---|
| 5,192,247 A | 3/1993 | Barr et al. | |
| 5,829,201 A | 11/1998 | Schelter et al. | |
| 6,428,419 B1 | 8/2002 | Sheldon | |
| 6,517,443 B1 | 2/2003 | Villella | |
| 9,510,164 B2 * | 11/2016 | Heubel | H04W 56/00 |
| 10,621,784 B2 * | 4/2020 | Khan | H04N 13/117 |
| 11,229,787 B2 * | 1/2022 | Daniels | H01B 13/00 |
| 11,564,854 B2 * | 1/2023 | Cooper | G16H 40/63 |
| 11,679,337 B2 | 6/2023 | Anderson | |
| 2011/0102161 A1 * | 5/2011 | Heubel | G06F 3/016 |
| | | | 704/275 |
| 2018/0144525 A1 | 5/2018 | Gutierrez et al. | |
| 2019/0102941 A1 * | 4/2019 | Khan | H04N 13/243 |
| 2020/0063381 A1 * | 2/2020 | Trilling | A61H 3/066 |
| 2020/0097088 A1 * | 3/2020 | Welch | A63F 13/28 |
| 2020/0237586 A1 * | 7/2020 | Choi | A61G 5/1016 |
| 2020/0237591 A1 * | 7/2020 | Choi | A61G 5/048 |
| 2020/0353239 A1 * | 11/2020 | Daniels | A61N 1/02 |
| 2022/0287894 A1 * | 9/2022 | Suzuki | A61G 5/04 |
| 2022/0331177 A1 * | 10/2022 | Guo | A63B 23/0476 |
| 2022/0387903 A1 * | 12/2022 | Anderson | A61G 5/104 |
| 2023/0039530 A1 * | 2/2023 | Resnick | G06V 10/7715 |

(Continued)

*Primary Examiner* — David Phantana-angkool
(74) *Attorney, Agent, or Firm* — Sterne, Kessler, Goldstein & Fox P.L.L.C.

(57) ABSTRACT

Systems, methods, and apparatuses disclosed herein can generate vibrations in relation to, for example, synchronous with, audio that is associated with an event being hosted at a venue. These systems, methods, and apparatuses can generate the vibrations at the one or more frequencies over the one or more intervals in time to provide physical sensations to an audience within the venue as the audience is viewing the event. These physical sensations can provide new immersive experiences to the audience as the audience is viewing the event. These systems, methods, and apparatuses can be mechanically coupled, for example, attached, to seats within the venue. The vibrations generated by these systems, methods, and apparatuses can propagate through the seats onto the audience to provide the new immersive experiences to the audience as the audience is viewing the event. These systems, methods, and apparatuses can be attached to the seats at the start of the event and can thereafter be de-attached, or removed, from the seats at the conclusion of the event.

26 Claims, 13 Drawing Sheets

(56) References Cited

U.S. PATENT DOCUMENTS

| | | | |
|---|---|---|---|
| 2023/0125250 A1* | 4/2023 | Hiromi | G06F 3/016 381/56 |
| 2023/0186781 A1* | 6/2023 | Kim | H04S 3/008 703/8 |
| 2023/0271101 A1* | 8/2023 | Anderson | A61G 5/104 472/136 |

* cited by examiner

PORTABLE HAPTIC SYSTEMS FOR USE WITHIN A VENUE

BACKGROUND

The Americans with Disabilities Act (ADA) is a civil rights law that prohibits discrimination based on disability. Title III of the ADA is directed toward public accommodations and commercial facilities. Under this title, "[n]o individual shall be discriminated against on the basis of disability in the full and equal enjoyment of the goods, services, facilities, privileges, advantages, or accommodations of any place of public accommodation by any person who owns, leases (or leases to), or operates a place of public accommodation." Public accommodations, under the ADA, include "a motion picture house, theater, concert hall, stadium, or other place of exhibition or entertainment" and "an auditorium, convention center, lecture hall, or other place of public gathering." The ADA requires new public accommodations to be accessible to people with disabilities so they, their families, and friends can enjoy equal access to entertainment, recreation, and leisure.

To be to be ADA-compliant, public accommodations are required to have wheelchair accessible seating with at least one percent of the seating is to be wheelchair seating locations. The wheelchair seating locations are to provide lines of sight comparable to those provided to other spectators. These wheelchair seating locations are to be open, level spaces that accommodate people using wheelchairs and have smooth, stable, and slip-resistant surfaces. These wheelchair seating locations are to be an integral part of the seating plan so that people using wheelchairs are not isolated from other spectators or their friends or family. Moreover, companion seats are to be provided next to the wheelchair seating locations to accommodate friend or companion of the people using wheelchairs. The wheelchair seating locations are to be provided in all areas including sky boxes and specialty areas. And, whenever more than three hundred (300) seats are provided, wheelchair seating locations are to be provided in more than one location to provide choices of admission prices and views comparable to those for the general public. The wheelchair seating locations are to be on accessible routes that provide access from parking and transportation areas and that connects to all public areas, including concessions, restaurants, rest rooms, public telephones, and exits.

BRIEF DESCRIPTION OF THE DRAWINGS/FIGURES

The accompanying drawings, which are incorporated herein and form a part of the specification, illustrate the present disclosure and, together with the description, further serve to explain the principals thereof and to enable a person skilled in the pertinent art to make and use the same. In the drawings.

Figure 6:
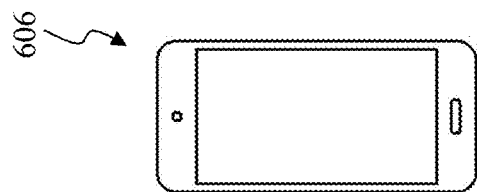
Figure 6:
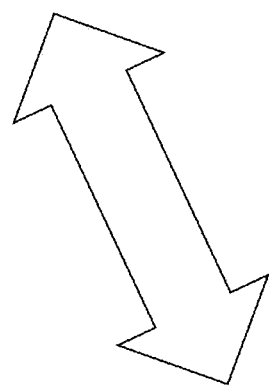
Figure 6:
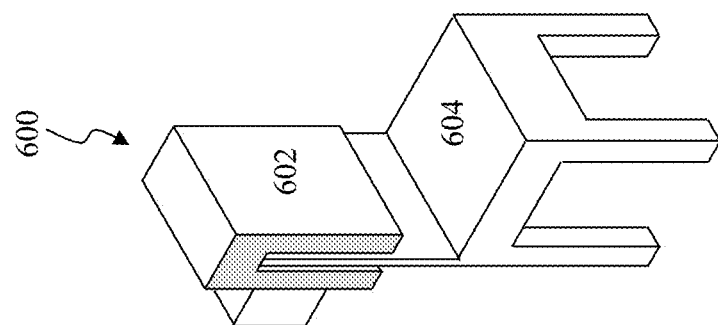
Figure 7A:
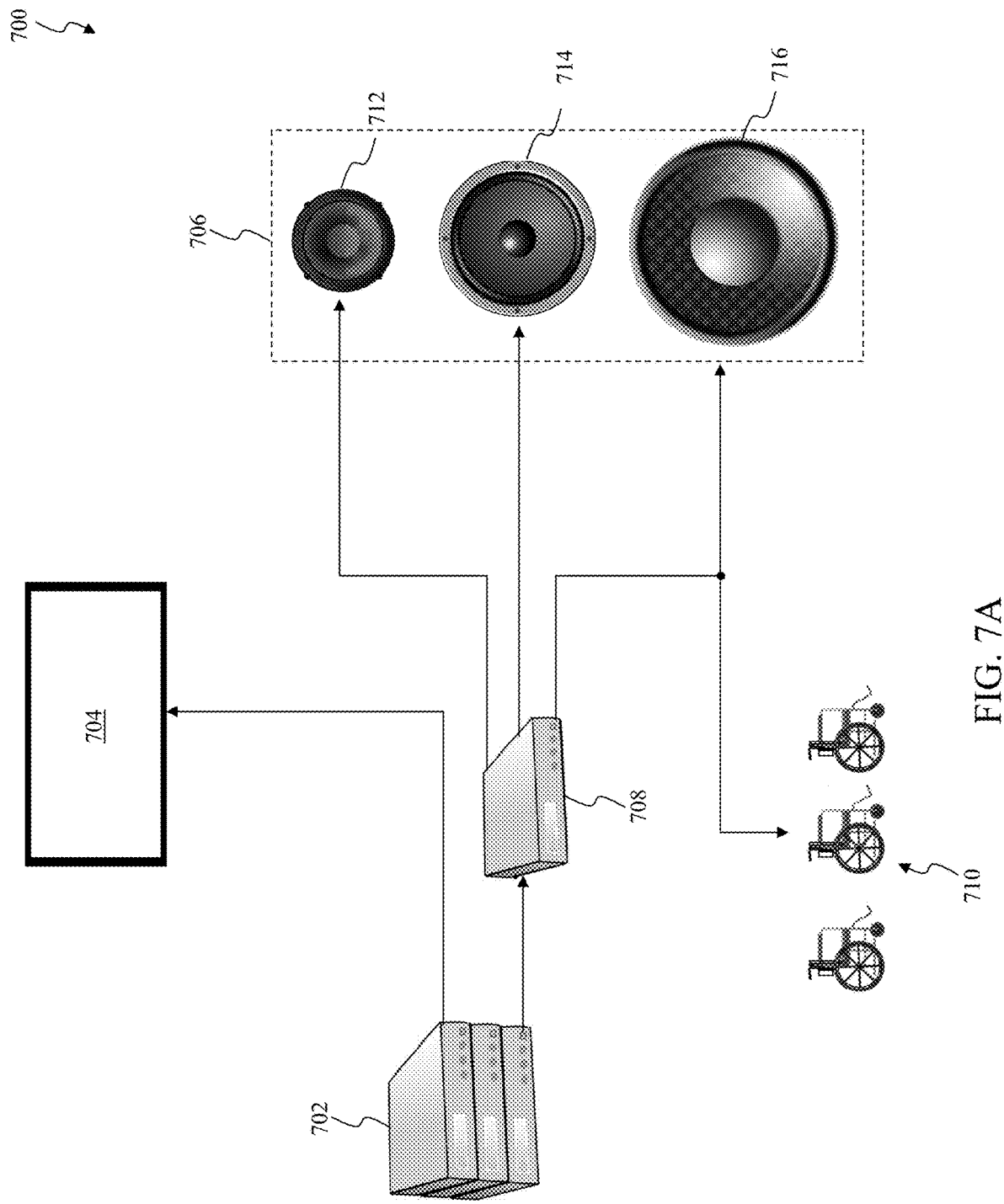
Figure 7B:
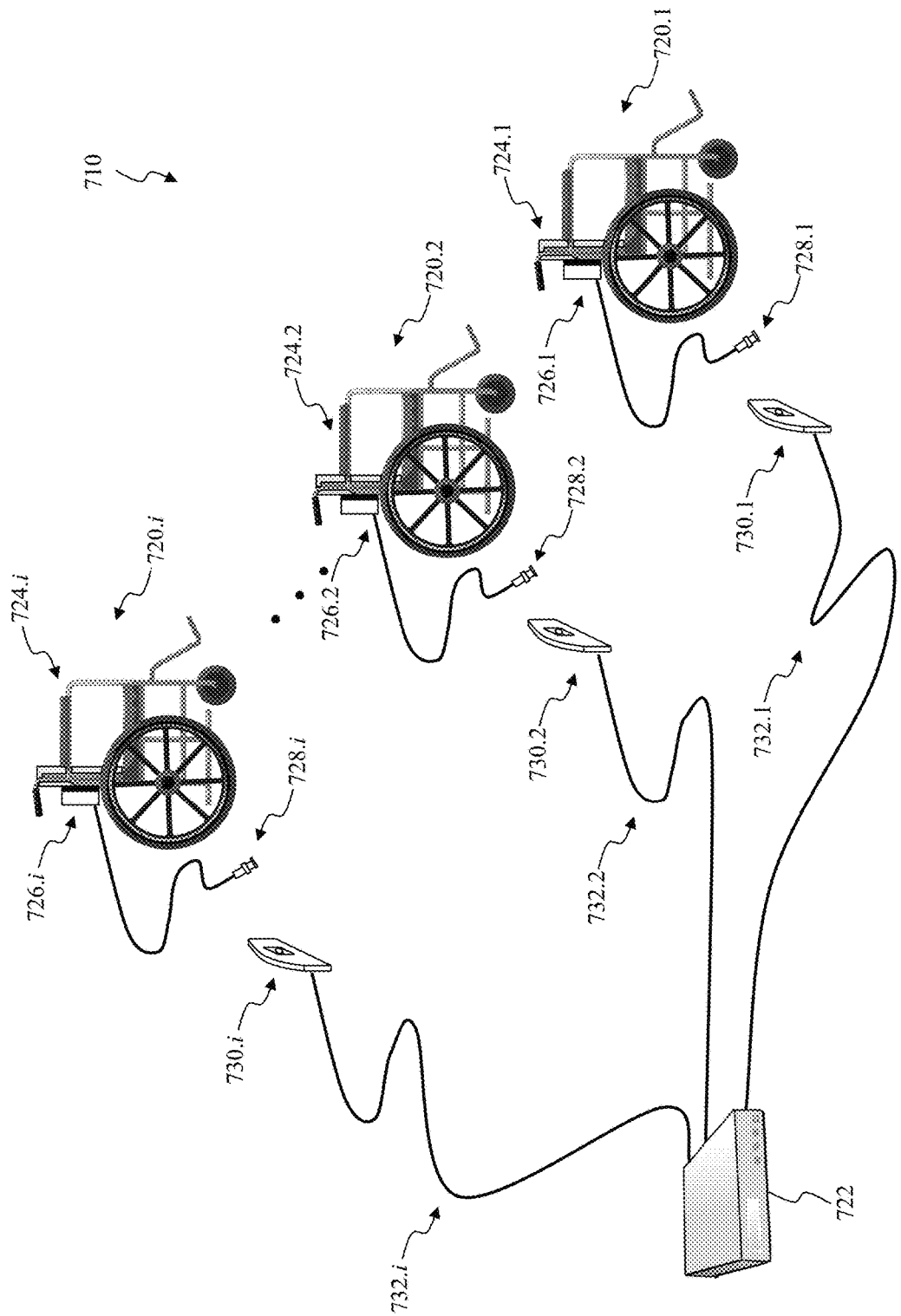
Figure 8:
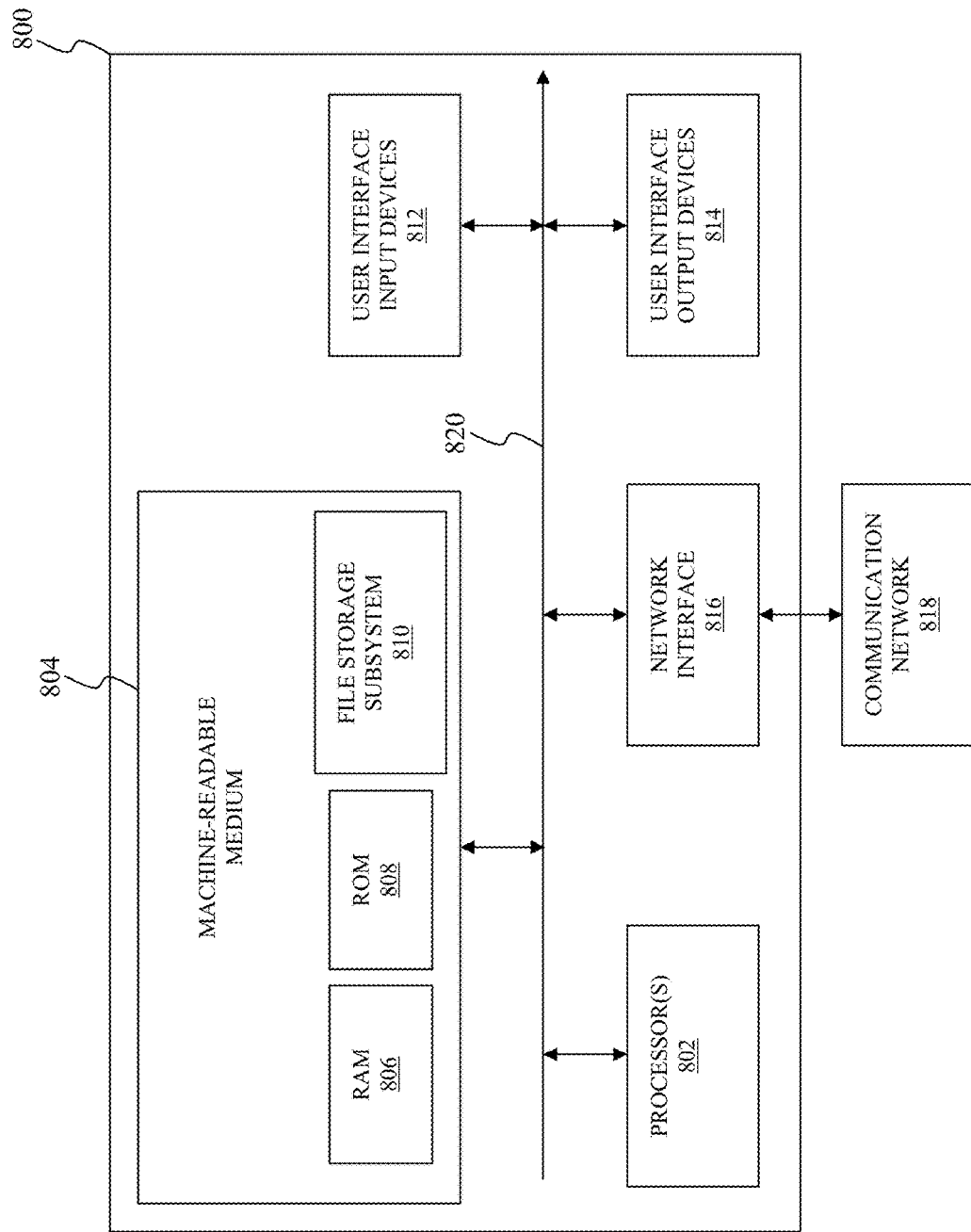

FIG. 6 graphically illustrates a first exemplary operation of the exemplary portable haptic devices in accordance with some exemplary embodiments of the present disclosure;

FIGS. 7A and 7B graphically illustrates a second exemplary operation of the exemplary portable haptic devices in accordance with some exemplary embodiments of the present disclosure; and FIG. 8 graphically illustrates a simplified block diagram of a computer system that can be utilized to implement electronic devices within the exemplary venue according to some embodiments of the present disclosure.

In the accompanying drawings, like reference numbers indicate identical or functionally similar elements. Additionally, the left most digit(s) of a reference number identifies the drawing in which the reference number first appears.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the examples. This repetition does not in itself dictate a relationship between the embodiments and/or configurations discussed.

Overview

Systems, methods, and apparatuses disclosed herein can generate vibrations in relation to, for example, synchronous with, audio that is associated with an event being hosted at a venue. These systems, methods, and apparatuses can generate the vibrations at the one or more frequencies over the one or more intervals in time to provide physical sensations to an audience within the venue as the audience is viewing the event. These physical sensations can provide new immersive experiences to the audience as the audience is viewing the event. These systems, methods, and apparatuses can be mechanically coupled, for example, attached, to seats within the venue. The vibrations generated by these systems, methods, and apparatuses can propagate through the seats onto the audience to provide the new immersive experiences to the audience as the audience is viewing the event. These systems, methods, and apparatuses can be attached to the seats at the start of the event and can thereafter be de-attached, or removed, from the seats at the conclusion of the event.

Exemplary Venue

Figure 1:
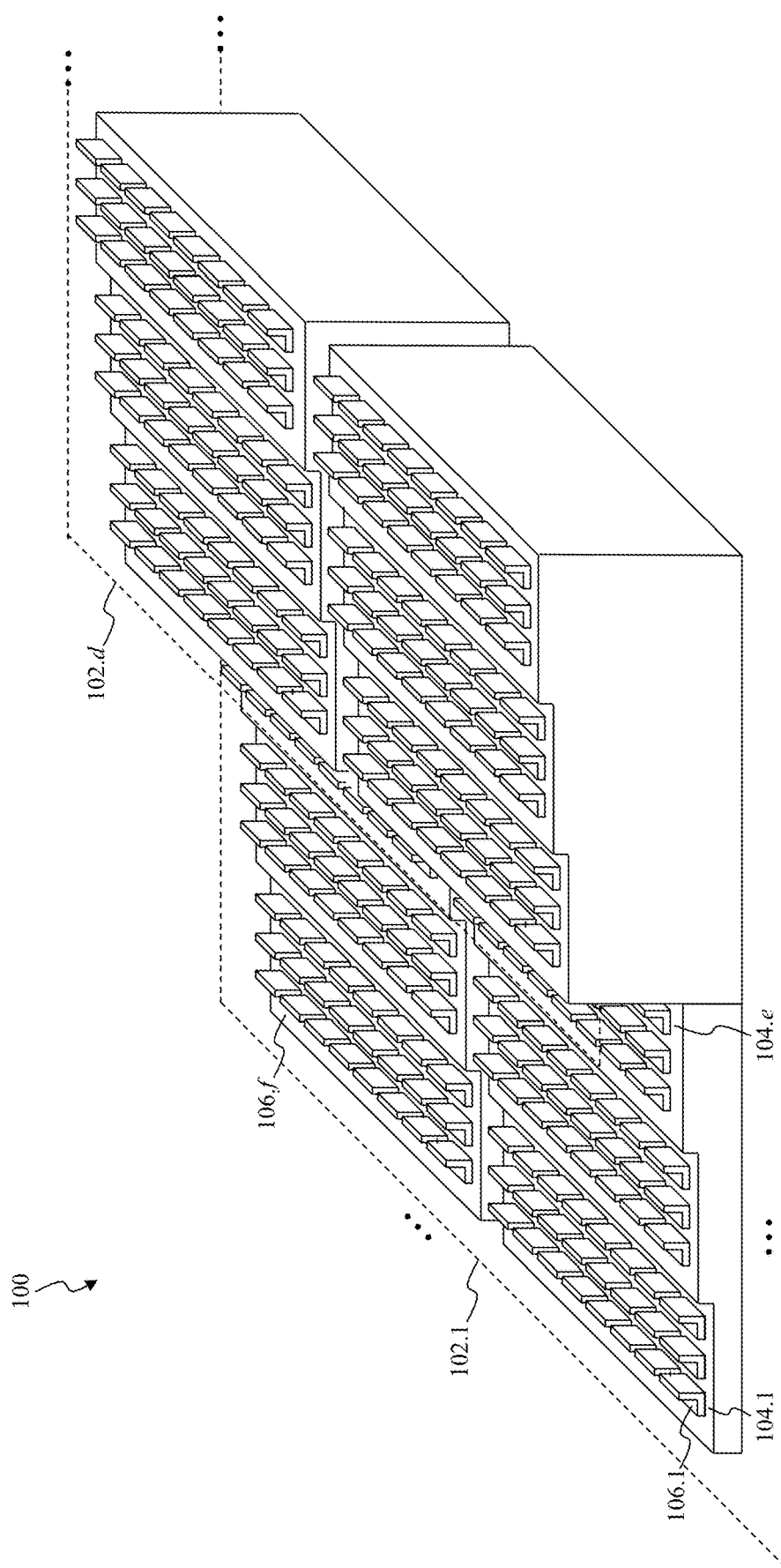
FIG. 1 illustrates a pictorial representation of an exemplary venue in accordance with some exemplary embodiments of the present disclosure.

FIG. 1 illustrates a pictorial representation of an exemplary venue in accordance with some exemplary embodiments of the present disclosure. In the exemplary embodiment illustrated in FIG. 1, a venue 100 represents a location for hosting an event. For example, the venue 100 can represent a music venue, for example, a music theater, a music club, and/or a concert hall, a sporting venue, for example, an arena, a convention center, and/or a stadium, and/or any other suitable venue that will be apparent to those skilled in the relevant art(s) without departing the spirit and scope of the present disclosure. The event can represent a musical event, a theatrical event, a sporting event, a motion picture, and/or any other suitable event that will be apparent to those skilled in the relevant art(s) without departing the spirit and scope of the present disclosure.

In the exemplary embodiment illustrated in FIG. 1, the venue 100 includes one or more seating sections 102.1 through 102.d to seat an audience to view the event. In some embodiments, the seating sections 102.1 through 102.d represent different seating sections at different heights for viewing the event. As illustrated in FIG. 1, the seating section 102.1 represents a lower seating section for viewing the event and the seating section 102.d represents an upper seating section above the seating section 102.1 for viewing the event. The seating sections 102.1 through 102.d include rows of seats 104.1 through 104.e for seating the audience to view the event. In some embodiments, the rows of seats 104.1 through 104.e represent different rows of seats at different heights for viewing the event. As illustrated in FIG. 1, the row of seats 104.1 represents a lower row of seats for viewing the event and the row of seats 104.e represents an upper row of seats above the row of seats 104.1 for viewing the event. As illustrated in FIG. 1, the rows of seats 104.1 through 104.e include seats 106.1 through 106.f for seating the audience to view the event.

Exemplary Portable Haptic Device

Figure 2A:
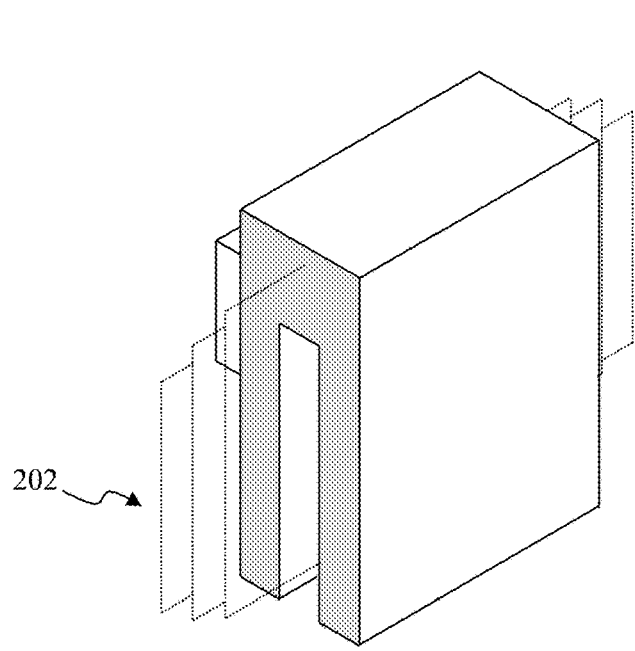
FIG. 2A through FIG. 2C illustrate pictorial representations of an exemplary portable haptic device in accordance with some exemplary embodiments of the present disclosure.
Figure 2B:
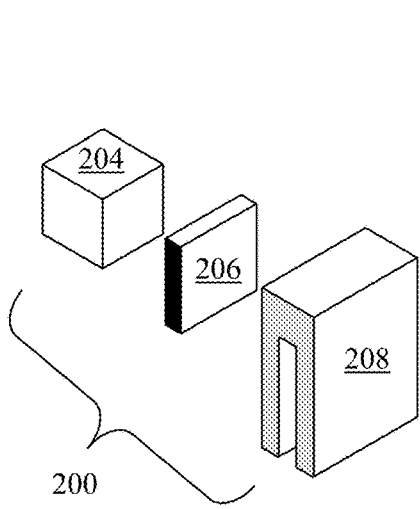
Figure 2C:
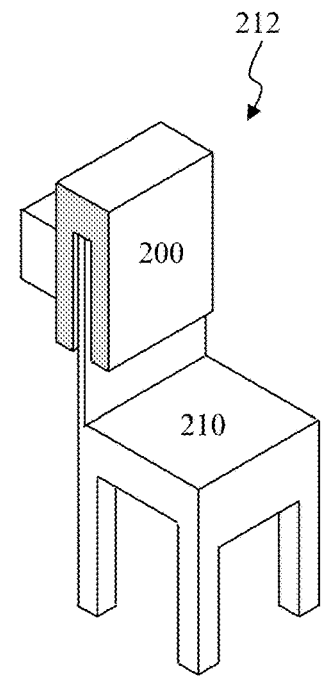

FIG. 2A through FIG. 2C illustrate pictorial representations of an exemplary portable haptic device in accordance with some exemplary embodiments of the present disclosure. Generally, haptic technology refers to technologies that can generate forces, vibrations, or motions to provide physical sensations to an audience as the audience is viewing an event in a venue, such as the venue 100 as described above in FIG. 1 to provide an example. Haptic feedback, or simply haptics, as illustrated in FIG. 2A through FIG. 2C refers to a type of haptics technology that generates controlled vibrations at one or more frequencies over one or more intervals in time to provide physical sensations to the audience as the audience is viewing the event. As illustrated in FIG. 2A, a portable haptic device 200 can generate vibrations 202 at the one or more frequencies over the one or more intervals in time to provide the physical sensations to the audience as the audience is viewing the event. In some embodiments, these physical sensations can provide new immersive experiences to the audience as the audience is viewing the event. As to be described in further detail below, the event can include an image or a series of images, often referred to as video, and audio that is associated with the image, or the video. In some embodiments, the portable haptic device 200 can generate the vibrations 202 in relation to, for example, synchronous with, the audio that is associated with the image, or the video. In these embodiments, the portable haptic device 200 can generate the vibrations 202 to be synchronous with the lowest sounds of the audio, often referred to as bass sounds between approximately sixteen (16) Hz and approximately two hundred fifty-six (256) Hz to provide an example. For example, the portable haptic device 200 can generate vibrations 202 between four (4) Hertz (Hz) and one hundred twenty-five (125) Hz to simulate the rumbling of audio of thunder as the audience is viewing a thunderstorm within the venue.

As illustrated in FIG. 2B, the portable haptic device 200 can include a haptic device 204, a mechanical mounting assembly 206, and a mechanical coupling assembly 208. Although the portable haptic device 200 is illustrated in FIG. 2B as including multiple, discrete components, those skilled in the relevant art(s) will recognize that one of more of these components can be combined without departing from the spirit and scope of the present disclosure. For example, the mechanical mounting assembly 206 and the mechanical coupling assembly 208 can be combined into a single mechanical assembly as will be apparent to those skilled in the relevant art(s) without departing from the spirit and scope of the present disclosure. The haptic device 204 generates the vibrations 202 at the one or more frequencies over the one or more intervals in time to provide the physical sensation to the member of the audience as the audience is viewing the event. In some embodiments, the haptic device 204 can include a tactile transducer, an eccentric rotating mass vibration (ERMV) motor, a linear resonant actuator (LRA), and/or a piezo haptics sensor to provide some examples.

The mechanical mounting assembly 206 can be mechanically coupled to the haptic device 204 and the mechanical coupling assembly 208 can be mechanically coupled to the mechanical mounting assembly 206. In some embodiments, the haptic device 204 can be mechanically connected to the mechanical mounting assembly 206 and/or the mechanical mounting assembly 206 can be mechanically connected to the mechanical coupling assembly 208 using one or more mechanical fasteners, such as nuts, screws, bolts, rivets, pins, and/or lags to provide some examples. In the exemplary embodiment illustrated in FIG. 2B, the vibrations 202 generated by the portable haptic device 200 can propagate through the mechanical mounting assembly 206 and/or the mechanical coupling assembly 208. In some embodiments, the mechanical mounting assembly 206 and/or the mechanical coupling assembly 208 can vibrate at the one or more frequencies over the one or more intervals in time as the vibrations 202 propagate through the mechanical mounting assembly 206 and/or the mechanical coupling assembly 208. In some embodiments, the mechanical mounting assembly 206 and/or the mechanical coupling assembly 208 can be constructed using one or more metallic elements, for example, copper, aluminum, one or more metallic compounds, one or more metallic mixtures, or alloys, such as steel to provide an example, and/or any other suitable metallic material that will be apparent to those skilled in the relevant art(s) without departing from the spirit and scope of the present disclosure. In some embodiments, the mechanical mounting assembly 206 and/or the mechanical coupling assembly 208 can be constructed using one or more synthetic or semi-synthetic organic compounds or materials, such as plastic and/or fiberglass to provide some examples, one or more organic materials, such as carbon fiber to provide an example, and/or any other suitable non-metallic material that will be apparent to those skilled in the relevant art(s) without departing from the spirit and scope of the present disclosure.

As illustrated in FIG. 2C, a portable haptic system 212 can include the portable haptic device 200 mechanically coupled, for example, attached, to a seat 210. Generally, the seat 210 can represent a permanent seat within the venue, such as a seat within a telescopic platform, a fixed seat, a suite seat, or the like to provide some examples, or a temporary seat within the venue, such as a portable stadium seat, a folding portable seat, a portable theater/auditorium seat, a foldable potable stool, a wheelchair, or the like to provide some examples. In some embodiments, the seat 210 can represent an exemplary embodiment of one or more of the seats 106.1 through 106.f within the rows of seats 104.1 through 104.e within the one or more seating sections 102.1 through 102.d as described above in FIG. 1. In the exemplary embodiment illustrated in FIG. 2C, the vibrations 202 generated by the portable haptic device 200 as described above in FIG. 2A can propagate through the seat 210 onto a member of the audience that is seated in the seat 210 to provide the physical sensation to the member of the audience as the member of the audience is viewing the event. From the example above, the portable haptic device 200 can generate vibrations 202 between four (4) Hz and one hundred twenty-five (125) Hz to simulate the rumbling of audio of thunder. In this example, the vibrations 202 between four (4) Hz and one hundred twenty-five (125) Hz propagate through the seat 210 onto the member of the audience that is seated in the seat 210 to provide the physical sensation of rumbling thunder to the member of the audience as the member of the audience is viewing the thunderstorm within the venue.

In some embodiments, the portable haptic device 200 can be permanently attached to the seat 210 to form the portable haptic system 212. In these embodiments, the portable haptic device 200 and the seat 210 can together form a mechanical joint, also referred to as a sliding fit or a push fit, that enables the portable haptic device 200 to slide onto the seat 210 to form the portable haptic system 212. In these embodiments, the portable haptic device 200 can be attached to the seat using one or more mechanical fasteners, such as nuts, screws, bolts, rivets, pins, and/or lags to provide some examples, and can thereafter be de-attached, or removed, from the seat 210 by removing the one or more mechanical fasteners. In these embodiments, the portable haptic device 200 can be attached to the seat 210 by sliding onto the seat 210, for example, at the start of the event, then attaching the portable haptic device 200 to the seat 210 using the one or more mechanical fasteners. In these embodiments, the portable haptic device 200 can be de-attached from the seat 210 by removing the one or more mechanical fasteners then sliding the portable haptic device 200 from the seat 210, for example, at the conclusion of the event.

In some embodiments, the portable haptic device 200 can be temporarily attached to the seat 210 to form the portable haptic system 212. In these embodiments, the portable haptic device 200 and the seat 210 can together form a mechanical joint, also referred to as a sliding fit or a push fit, that enables the portable haptic device 200 to slide onto the seat 210 to form the portable haptic system 212. In these embodiments, the portable haptic device 200 is held to the seat 210 by friction once the portable haptic device 200 is attached to the seat 210. In these embodiments, the portable haptic device 200 can be characterized as being as closely sliding, sliding, precision running, closely running, medium running, free running, and/or loosely running onto the seat 210. In some embodiments, the portable haptic device 200 can be attached to the seat and can thereafter be de-attached, or removed, from the seat 210 without suffering any permanent damage to the seat 210. In these embodiments, the portable haptic device 200 can be attached to the seat 210 by sliding onto the seat 210, for example, at the start of the event. In these embodiments, the portable haptic device 200 can be de-attached from the seat 210 by sliding from the seat 210, for example, at the conclusion of the event without suffering any permanent damage to the seat 210. In some embodiments, the portable haptic device 200 can be temporarily secured to the seat 210, for example, using one or more mechanical fasteners, such as hook-and-loop fasteners and/or tie-down straps to provide some examples.

Exemplary Ada Complaint Portable Haptic Device

Referring back to FIG. 1 above, the Americans with Disabilities Act (ADA) requires the venue 100 to be accessible to people with disabilities so they, their families, their companions, and/or friends can enjoy equal access to the event. In the exemplary embodiment illustrated in FIG. 1, the venue 100 can includes one or more wheelchair accessible seating locations to be ADA-compliant. Generally, the one or more wheelchair accessible seating locations can be located on one or more accessible routes within the venue 100 that provide access from parking and transportation areas and/or that provide access to public areas within the venue 100, such as concessions, restaurants, rest rooms, public telephones, and/or exits to provide some examples. In some embodiments, the one or more wheelchair accessible seating locations can be arranged within the venue 100 to have lines of sight comparable to those provided to other spectators. In these embodiments, for example, where spectators can be expected to stand during the event, the one or more wheelchair accessible seating locations can provide lines of sight over standing spectators and over the shoulders of the persons standing in the row immediately in front and over the heads of the persons standing two rows in front. In the exemplary embodiment illustrated in FIG. 1, the number of wheelchair accessible seating locations from among the one or more wheelchair accessible seating locations can be at least one (1) percent of the available seating to be ADA-compliant. In some embodiments, for example, when the venue 100 includes more than 300 available seats, the one or more wheelchair accessible seating locations can be dispersed among different locations within the venue, such as within different seating sections from among the sections 102.1 through 102.d to provide an example. In some embodiments, the one or more wheelchair accessible seating locations can be dispersed among the different locations to provide a choice of admission prices and views comparable to those for the general public. In the exemplary embodiment illustrated in FIG. 1, a person with a disability can view the event from a wheelchair that is placed within one of these wheelchair accessible seating locations. And as to be described in further detail below, the portable haptic device 200 can be mechanically coupled, for example, attached, to the wheelchair to provide a physical sensation to the person with the disability as the person with the disability is viewing the event.

Figure 3A:
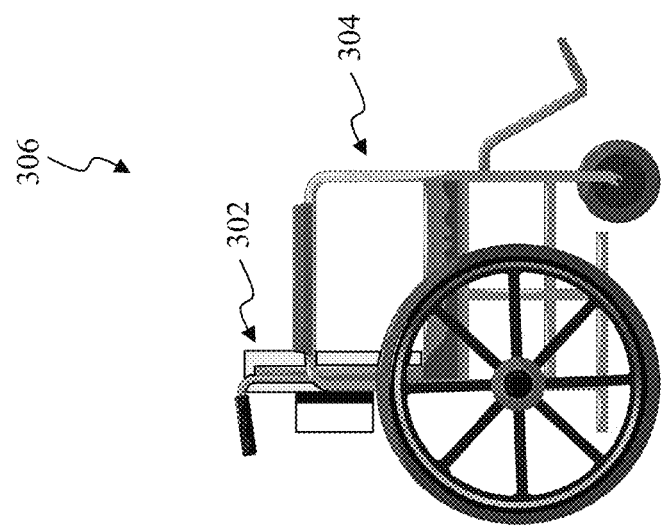
FIG. 3A and FIG. 3B illustrate pictorial representations of an exemplary Americans with Disabilities Act (ADA) compliant portable haptic device in accordance with some exemplary embodiments of the present disclosure.
Figure 3A:
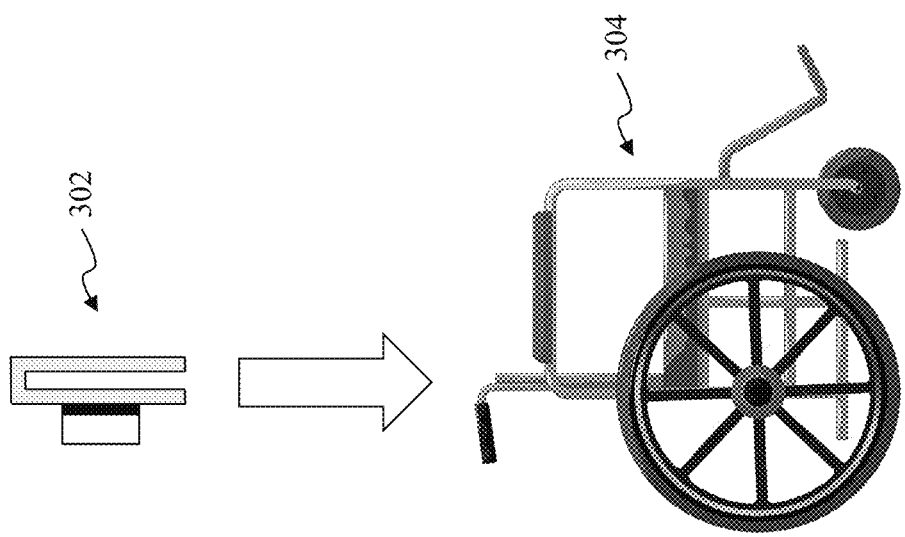
Figure 3B:
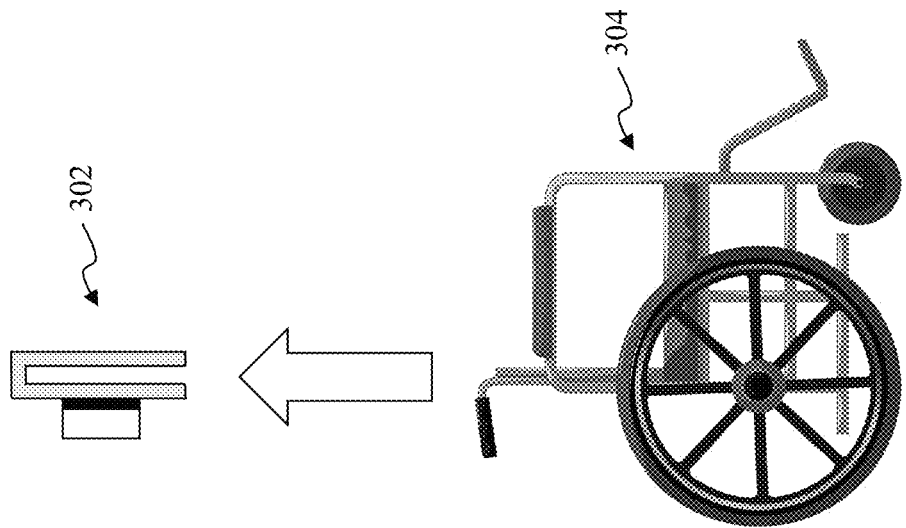
Figure 3B:
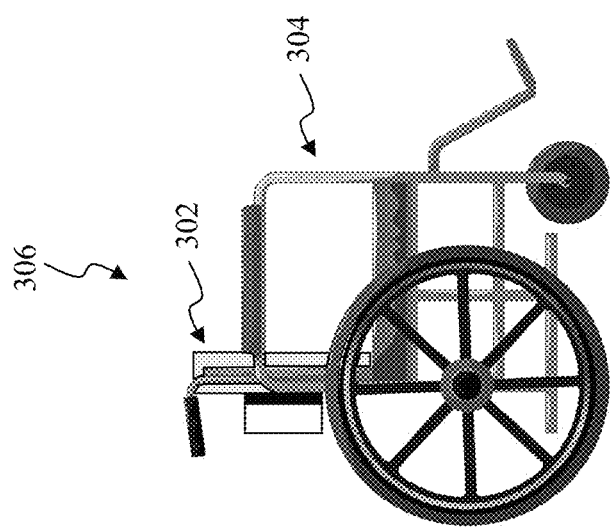

FIG. 3A and FIG. 3B illustrate pictorial representations of an exemplary Americans with Disabilities Act (ADA) compliant portable haptic device in accordance with some exemplary embodiments of the present disclosure. As described above, the Americans with Disabilities Act (ADA) requires a venue, such as the venue 100 as described above in FIG. 1 to provide an example, be accessible to people with disabilities so they, their families, their companions, and/or friends can enjoy equal access to the event. In the exemplary embodiments illustrated in FIG. 3A and FIG. 3B, the venue can include one or more wheelchair accessible seating locations to be ADA-compliant. As to be described in further detail below, a person with a disability can view the event from a wheelchair 304 that is placed within one of these wheelchair accessible seating locations. In some embodiments, a portable haptic device 302 can be mechanically coupled, for example, attached, to the wheelchair 304 in a substantially similar manner as described above in FIG. 2A through FIG. 2C. In some embodiments, vibrations generated by the portable haptic device 302 can propagate through the wheelchair 304 onto the person with the disability to provide a physical sensation to the person with the disability as the person with the disability is viewing the event. In these embodiments, this physical sensation can provide the person with the disability with a similar new immersive experience as the audience is viewing the event as other members of the audience that is seated in the venue as described above in FIG. 2A through FIG. 2C to be ADA-compliant. The portable haptic device 302 and the wheelchair 304 can represent exemplary embodiments of the portable haptic device 200 and the seat 210, respectively, as described above in FIG. 2A through FIG. 2C.

As illustrated in FIG. 3A, the portable haptic device 302 can be mechanically coupled, for example, attached, to the wheelchair 304 in a substantially similar manner as the portable haptic device 100 as described above in FIG. 2A through FIG. 2C to form a portable haptic device system 306. In some embodiments, the portable haptic device 302 can be temporarily attached to the wheelchair 304 to form the portable haptic device system 306. In these embodiments, the portable haptic device 302 can be attached onto the wheelchair 304 at the start of the event. In these embodiments, the portable haptic device 302 can be attached onto the wheelchair 304 without suffering any permanent damage to the wheelchair 304. This beneficially allows the person with the disability to use their own personal wheelchair to view the event from one of these wheelchair accessible seating locations without suffering any permanent damage to their own personal wheelchair. In some embodiments, vibrations generated by the portable haptic device 302 can propagate through the portable haptic device 302 onto the person with the disability that is seated in the wheelchair 304 to provide the physical sensation to the person with the disability as the person with the disability is viewing the event. And as illustrated in FIG. 3B, the portable haptic device system 306 can be mechanically decoupled, for example, de-attached. In some embodiments, the portable haptic device 302 can be mechanically decoupled, for example, de-attached, from the portable haptic device 302 as illustrated in FIG. 3B. In these embodiments, the portable haptic device 302 can be de-attached from the wheelchair 304 at the conclusion of the event. In these embodiments, the portable haptic device 302 can be de-attached from the wheelchair 304 without suffering any permanent damage to the wheelchair 304.

Figure 4:
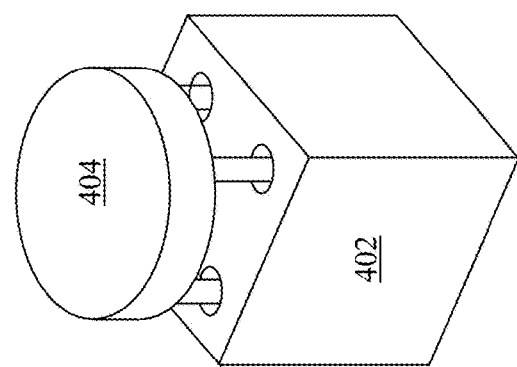
FIG. 4 illustrates a pictorial representation of an exemplary haptic device that can be implemented within the exemplary portable haptic devices in accordance with some exemplary embodiments of the present disclosure.

Exemplary Haptic Device that can be Implemented within the Exemplary Portable Haptic Devices FIG. 4 illustrates a pictorial representation of an exemplary haptic device that can be implemented within the exemplary portable haptic devices in accordance with some exemplary embodiments of the present disclosure. In the exemplary embodiment illustrated in FIG. 4, a haptic device 400 can generate vibrations, such as the vibrations 102 as described above in FIG. 2A through FIG. 2C to provide an example, to provide a physical sensation to a member of an audience as the audience is viewing the event in a substantially similar manner as described above in FIG. 2A through FIG. 2C. In some embodiments, the haptic device 400 can be implemented using a tactile transducer, also referred to as a bass shaker. The tactile transducer represents a type of linear resonant actuator (LRA) that oscillates about one or more principal axes, such as the x-axis, the y-axis, and/or the z-axis of the Cartesian coordinate system to provide some examples, to generate the vibrations. As illustrated in FIG. 4, the haptic device 400 includes a mechanical housing 402 and a moveable plate 404. The haptic device 400 can represent an exemplary embodiment of the haptic device 204 as described above in FIG. 2A through FIG. 2C.

In the exemplary embodiment illustrated in FIG. 4, the haptic device 400 includes one or more pistons which are driven by one or more voice coils within the mechanical housing 402. The one or more voice coils can exert force on the one or more pistons that are coupled to the moveable plate 404 to cause the moveable plate 404 to oscillate, for example, move back and forth, along the one or more principal axes to generate the vibrations. As described above, the event can include an image or a series of images, often referred to as video, and audio that is associated with the image, or the video. In some embodiments, the haptic device 400 can generate the vibrations in relation to, for example, synchronous with, the audio that is associated with the image, or the video. In these embodiments, the audio can be within the lowest sounds of the audio, often referred to as bass sounds between approximately sixteen (16) Hz and approximately two hundred fifty-six (256) Hz to provide an example. In some embodiments, the audio can cause these voice coils to oscillate, for example, move back and forth, along the one or more principal axes. In these embodiments, this oscillation of the one or more voice coils can cause the moveable plate 404 to similarly oscillate along the one or more principal axes to generate the vibrations.

Exemplary Mechanical Coupling Assemblies that can be Implemented within the Exemplary Portable Haptic Devices FIG. 5A through FIG. 5F illustrate pictorial representations of exemplary mechanical coupling assemblies that can be implemented within the exemplary portable haptic devices in accordance with some exemplary embodiments of the present disclosure. The discussion of FIG. 5A through FIG. 5F below is to describe exemplary mechanical coupling assemblies that can be implemented within the exemplary portable haptic devices as described above in FIG. 2A through FIG. 2C and/or FIG. 3A and FIG. 3B. However, the various exemplary mechanical coupling assemblies to be described in further detail below in FIG. 5A through FIG. 5F are not limiting, other mechanical coupling assemblies are possible that will be apparent to those skilled in the relevant art(s) without departing from the spirit and scope of the present disclosure. These exemplary mechanical coupling assemblies to be described in further detail below in FIG. 5A through FIG. 5F can be mechanically coupled, for example, attached, to a seat, such the seat 210 as described above in FIG. 2A through FIG. 2C and/or the wheelchair 304 as described above in FIG. 3A and FIG. 3B. These mechanical coupling assemblies to be described in further detail below in FIG. 5A through FIG. 5F can propagate vibrations, generated by a haptic device, such as the haptic device 204 as described above in FIG. 2A through FIG. 2C and/or the haptic device 400 as described above in FIG. 4, onto the seat in a substantially similar manner as described above in FIG. 2A through FIG. 2C and/or FIG. 3A and FIG. 3B. In some embodiments, these mechanical coupling assemblies to be described in further detail below in FIG. 5A through FIG. 5F can be constructed using one or more metallic elements, for example, copper, aluminum, one or more metallic compounds, one or more metallic mixtures, or alloys, such as steel to provide an example, and/or any other suitable metallic material that will be apparent to those skilled in the relevant art(s) without departing from the spirit and scope of the present disclosure. In some embodiments, these mechanical coupling assemblies to be described in further detail below in FIG. 5A through FIG. 5F can be constructed using one or more synthetic or semi-synthetic organic compounds or materials, such as plastic and/or fiberglass to provide some examples, one or more organic materials, such as carbon fiber to provide an example, and/or any other suitable non-metallic material that will be apparent to those skilled in the relevant art(s) without departing from the spirit and scope of the present disclosure. These mechanical coupling assemblies to be described in further detail below in FIG. 5A through FIG. 5F can represent exemplary embodiments of the mechanical coupling assembly 208 as described above in FIG. 2A through FIG. 2C.

Figure 5A:
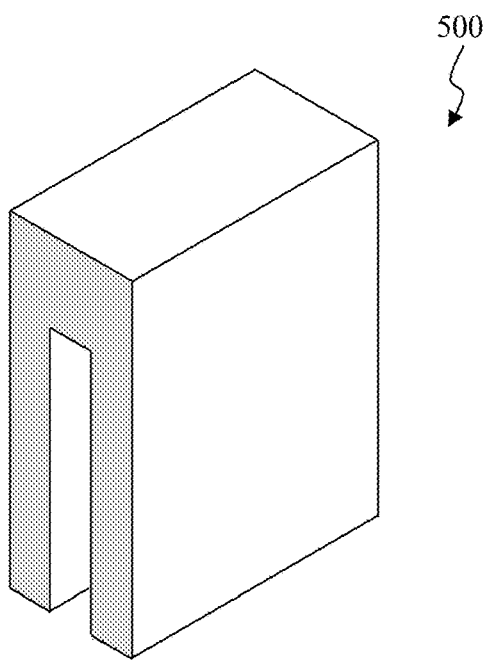
FIG. 5A through FIG. 5F illustrate pictorial representations of exemplary mechanical coupling assemblies that can be implemented within the exemplary portable haptic devices in accordance with some exemplary embodiments of the present disclosure.

FIG. 5A graphically illustrates a first mechanical coupling assembly 500 that can be mechanically coupled, for example, attached, to the seat. As illustrated in FIG. 5A, the first mechanical coupling assembly 500 can be characterized as being a "U" shape, or a "U"-like shape, that attaches onto the seat, for example, by the interference fit as described above in FIG. 2A through FIG. 2C. In some embodiments, a sheet of material can be deformed, bent, or folded into the "U" shape, or the "U"-like shape, to form the first mechanical coupling assembly 500. For example, the sheet of material can be pressed, or stamped, into the "U" shape, or the "U"-like shape to form the first mechanical coupling assembly 500. Alternatively, or in addition to, the first mechanical coupling assembly 500 can be formed through injection molding. In some embodiments, a mold of the "U" shape, or the "U"-like shape, of the first mechanical coupling assembly 500 can be created. In these embodiments, material can be injected at pressure into the mold that solidifies to produce the first mechanical coupling assembly 500.

Figure 5B:
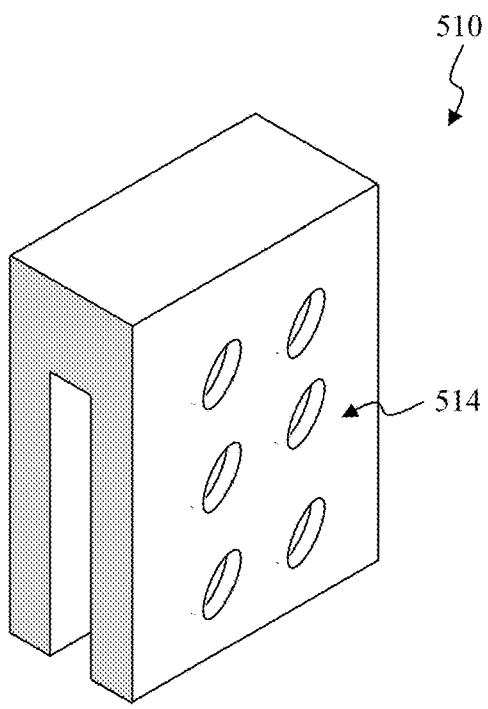

FIG. 5B graphically illustrates a second mechanical coupling assembly 510 that can be mechanically coupled, for example, attached, to the seat. The second mechanical coupling assembly 510 is substantially similar to the first mechanical coupling assembly 500 as described above in FIG. 5A. However, the second mechanical coupling assembly 510 includes one or more openings, or holes, 514 as illustrated in FIG. 5B. Generally, the one or more holes 514 represent one or more geometric regions within the second mechanical coupling assembly 510 that are free of material to, for example, reduce the weight of the second mechanical coupling assembly 510 as compared to the first mechanical coupling assembly 500. In some embodiments, the one or more holes 514 can include regular curves, such as circles or ellipses; irregular curves; regular polygons, such as equilateral triangles or squares, irregular polygons, such as rectangles and/or parallelograms; and/or any other suitable closed geometric regions that will be apparent to those skilled in the relevant art(s) without departing from the spirit and scope of the present disclosure. In some embodiments, the one or more holes 514 can extend along a series of rows of holes and/or a series of columns of holes to form an array of holes within the second mechanical coupling assembly 510.

Figure 5C:
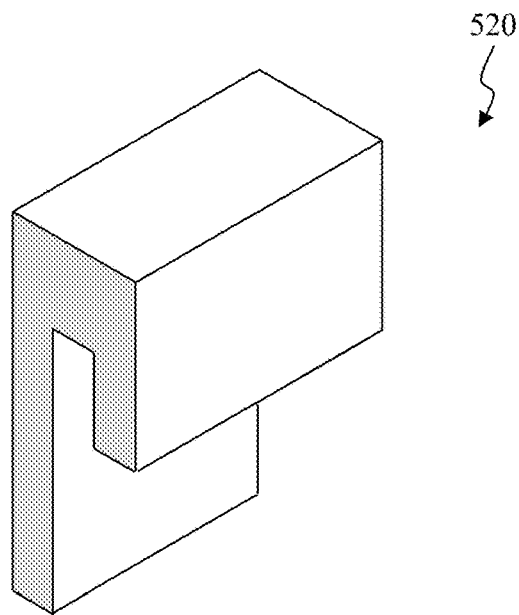

FIG. 5C graphically illustrates a third mechanical coupling assembly 520 that can be mechanically coupled, for example, attached, to the seat. The third mechanical coupling assembly 520 is substantially similar to the first mechanical coupling assembly 500 as described above in FIG. 5A. However, the third mechanical coupling assembly 520 can be characterized as being a "J" shape, or a "J"-like shape, that attaches onto the seat, for example, by the interference fit as described above in FIG. 2A through FIG. 2C.

Figure 5D:
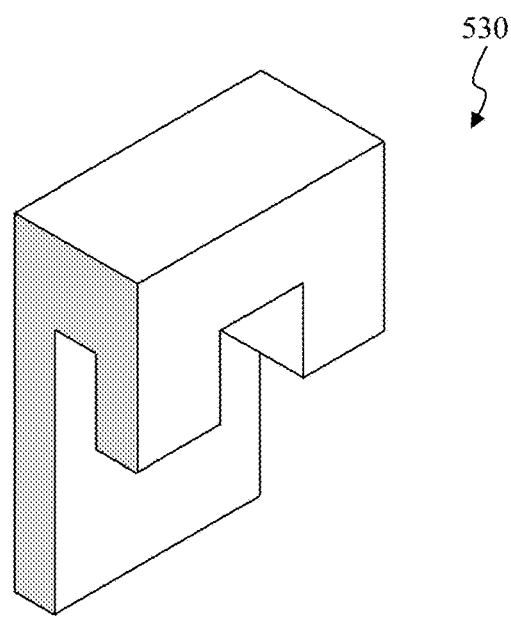

FIG. 5D graphically illustrates a fourth mechanical coupling assembly 530 that can be mechanically coupled, for example, attached, to the seat. The fourth mechanical coupling assembly 530 is substantially similar to the first mechanical coupling assembly 500 as described above in FIG. 5A. However, the fourth mechanical coupling assembly 530 can be characterized as being hooked shape, or hooked-like shape, that attaches onto the seat, for example, by the interference fit as described above in FIG. 2A through FIG. 2C.

Figure 5E:
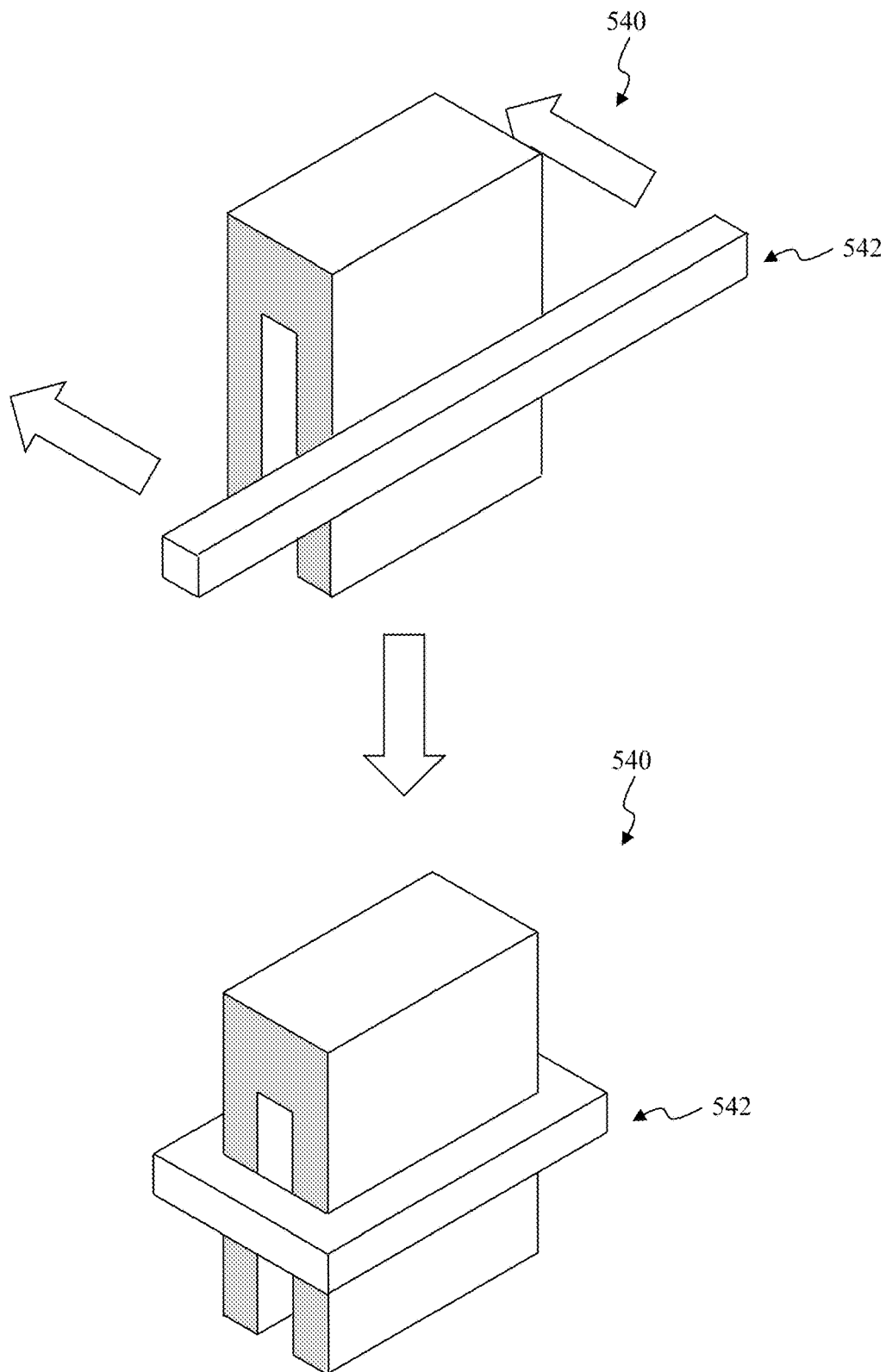

FIG. 5E graphically illustrates a fifth mechanical coupling assembly 540 that can be mechanically coupled, for example, attached, to the seat. As illustrated in FIG. 5E, the fifth mechanical coupling assembly 540 includes a securing member 542 to temporarily secure the fifth mechanical coupling assembly 540 to the seat. In some embodiments, the securing member 542 can effectively be wrapped around the seat as illustrated in FIG. 5E to temporarily secure the fifth mechanical coupling assembly 540 to the seat. The securing member 542 can be implemented with one or more mechanical fasteners, such as hook-and-loop fasteners and/or tie-down straps to provide some examples.

Figure 5F:
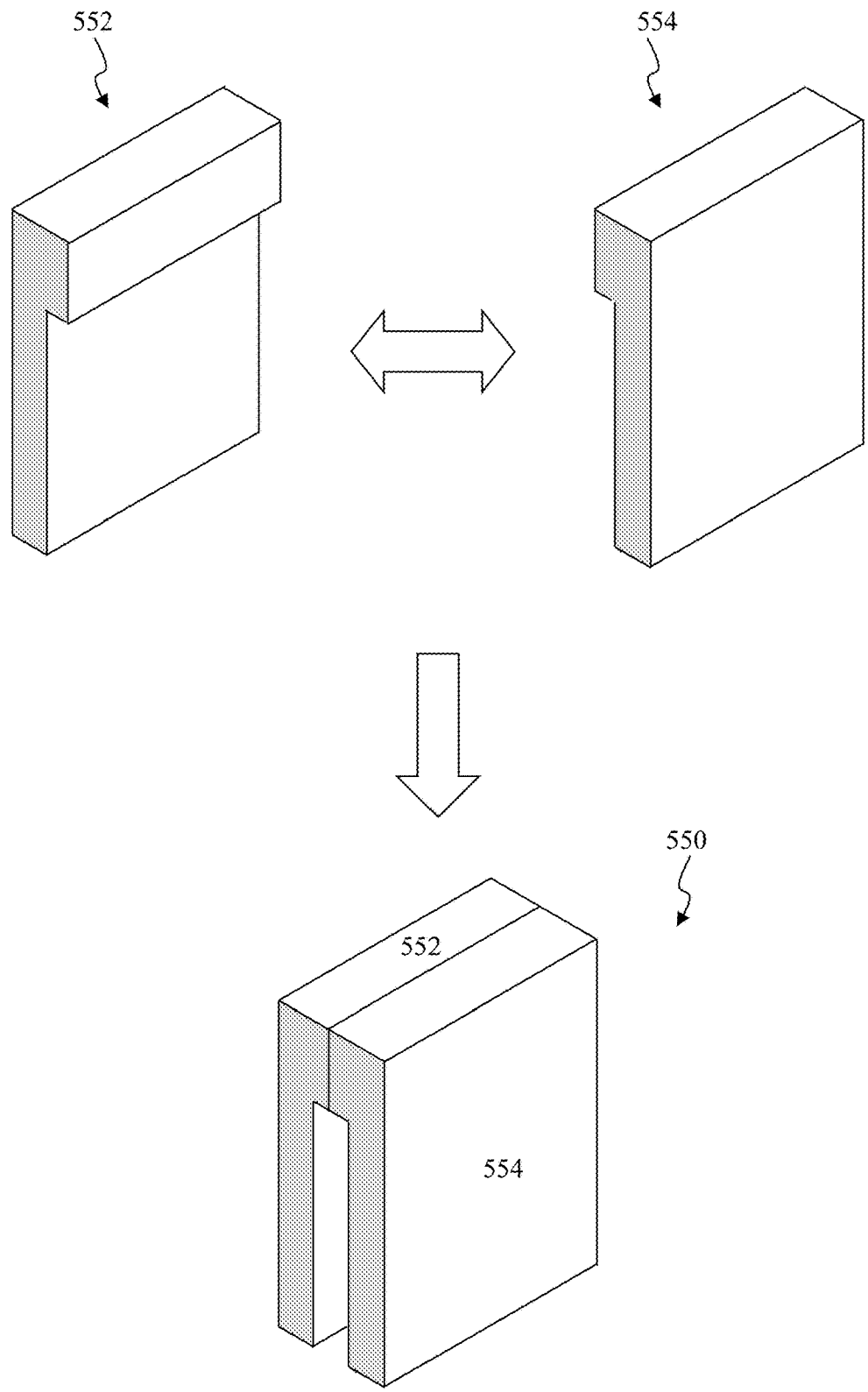

FIG. 5F graphically illustrates a sixth mechanical coupling assembly 550 that can be mechanically coupled, for example, attached, to the seat. As illustrated in FIG. 5F, the sixth mechanical coupling assembly 550 includes a first mechanical coupling assembly 552 and a second mechanical coupling assembly 554. In some embodiments, the first mechanical coupling assembly 552 can be mechanically coupled to the second mechanical coupling assembly 554 to form the sixth mechanical coupling assembly 550. In some embodiments, the first mechanical coupling assembly 552 and the second mechanical coupling assembly 554 can be configured and arranged to form various interlocking connectors, such as annular snap-together connectors, cantilever snap-together connectors, torsional snap-together connectors, and the like to provide some examples, which are connected to one another by pushing the first mechanical coupling assembly 552 and the second mechanical coupling assembly 554 into each other.

Exemplary Operation of the Exemplary Portable Haptic Devices

FIG. 6 graphically illustrates a first exemplary operation of the exemplary portable haptic devices in accordance with some exemplary embodiments of the present disclosure. In the exemplary embodiment illustrated in FIG. 6, a portable haptic system 600 can include a portable haptic device 602 that can be mechanically coupled, for example, attached, to a seat 604 in a substantially similar manner as described above in FIG. 2A through FIG. 2C. As illustrated in FIG. 6, a portable electronic device 606 can control the operation of the portable haptic device 602 as to be described in further detail below. The portable haptic device 602 and the seat 604 can represent exemplary embodiments of the portable haptic device 200 and the seat 210, respectively, as described above in FIG. 2A through FIG. 2C and/or the portable haptic device 302 and the wheelchair 304, respectively, as described above in FIG. 3A and FIG. 3B.

As described above, the portable electronic device 606 can control the operation of the portable haptic device 602. In some embodiments, the portable electronic device 606 can include a consumer electronics device, a cellular phone, a smartphone, a feature phone, a tablet computer, a wearable computer device, a personal digital assistant (PDA), a pager, a wireless handset, a desktop computer, a laptop computer, a head-up display (HUD) device, an embedded system, a microcontroller, a control module, a networked or "smart" appliance, a Machine-Type-Communication (MTC) device, a Machine-to-Machine (M2M) device, a Internet of Things (IoT) device, or the like. In some embodiments, the portable electronic device 606 can include an application program, or app for short, that, when executed by the portable electronic device 606, can control the operation of the portable haptic device 602. In these embodiments, a user of the portable haptic system 600, for example, the member of the audience as described above in FIG. 2A through FIG. 2C, can interact with the software application using the portable electronic device 606 to control the operation of the portable haptic device 602 as to be described in further detail below.

In the exemplary embodiment illustrated in FIG. 6, the portable electronic device 606 can store a unique identifier of the portable haptic device 602 being used by the user. In some embodiments, the unique identifier can include an Internet Protocol (IP) address of the portable haptic device 602, a media access controller (MAC) address of the portable haptic device 602, a model name of the portable haptic device 602, a serial number of the portable haptic device 602, a manufacturer name of the portable haptic device 602, a username and/or a password of the user; and/or any other suitable unique identifier that will be recognized by those skilled in the relevant art(s) without departing from the spirit and scope of the present disclosure. In some embodiments, the portable electronic device 606 can include, or reference, the unique identifier in communications to the portable haptic device 602 to allow these communications to be distinguished from other communications to other portable haptic device from other portable electronic devices.

In some embodiments, the user can interact with the portable electronic device 606 to activate, or turn-on, and/or to deactivate, or turn-off, the portable haptic device 602. In some embodiments, the user can interact with the portable electronic device 606 to configure the portable haptic device 602. In these embodiments, the portable electronic device 606 can be used to set boundaries, for example, in terms of magnitude, for the vibrations generated by the portable haptic device 602. In some embodiments, the portable electronic device 606 can display the event in real-time, or near real-time, instructions relating to the operation of the portable haptic device 602 and/or information related to the event, for example, close captioning. In these embodiments, the portable electronic device 606 can display advertisements and/or other information related to the venue, for example, a map of the venue highlighting concessions, restaurants, rest rooms, public telephones, and/or exits.

FIGS. 7A and 7B graphically illustrates a second exemplary operation of the exemplary portable haptic devices in accordance with some exemplary embodiments of the present disclosure. As described above, a seat within a venue, for example, one or more of the seats 106.1 through 106.f within the venue 100 to provide an example, can be mechanically coupled, for example, attached, to a portable haptic device, such as the portable haptic device 200 as described above in FIG. 2A through FIG. 2C, the portable haptic device 302 as described above in FIG. 3A and FIG. 3B, and/or the portable haptic device 602 as described above in FIG. 6. The portable haptic device can generate vibrations at the one or more frequencies over the one or more intervals in time to provide the physical sensations to the audience as the audience is viewing an event within the venue in a substantially similar manner as described above in FIG. 2A through FIG. 2C. And as described above, the event can include an image or a series of images, often referred to as video, and audio that is associated with the image, or the video. The discussion of FIG. 7A to follow is to describe an exemplary event system 700 that can generate the vibrations in relation to, for example, synchronous with, the audio that is associated with the image, or the video, in a substantially similar manner as described above in FIG. 2A through FIG. 2C. In the exemplary embodiment illustrated in FIG. 7A, the exemplary event system 700 can include an event server 702, a video system 704, an audio system 706, an audio crossover system 708, and portable haptic device systems 710. The portable haptic device systems 710 can include one or more of the portable haptic system 212 as described above in FIG. 2A through FIG. 2C, the portable haptic device system 306 as described above in FIG. 3A and FIG. 3B, and/or the portable haptic system 600 as described above in FIG. 6.

In the exemplary embodiment illustrated in FIG. 7A, the event server 702 represents one or more computer systems, an exemplary embodiment of which is to be described in further detail below, which facilitate operation of the venue. In some embodiments, the event server 702 can be implemented in hardware, firmware, software, or any combination thereof. Further, firmware, software, routines, instructions, and/or applications can be described herein as performing certain actions. However, it should be appreciated that such descriptions are merely for convenience and that these actions result from computing devices, processors, controllers, or other devices executing the firmware, software, routines, instructions, and/or applications. As illustrated in FIG. 7A, the event server 702 can deliver an image or a series of images, also referred to as video, and/or audio that is associated with the image, or the video, to the video system 704 and/or to the audio system 706 for presentation to an audience within the venue. From the example above, the event server 702 can deliver video and/or audio that is associated with a thunderstorm to the video system 704 and/or to the audio system 706 for presentation to an audience within the venue.

In the exemplary embodiment illustrated in FIG. 7A, the video system 704 can present the image, or the video, that is received from the event server 702 to the audience within the venue. From the example above, the video system 704 can present the video that is associated with the thunderstorm that is received from the event server 702 to the audience within the venue. In some embodiments, the video system 704 can include one or more visual displays, such as one or more flat-panel devices, such as one or more liquid crystal displays (LCDs), one or more light-emitting diode (LED) displays, one or more organic light-emitting diode (OLED) displays, and/or one or more quantum dots (QDs) displays to provide some examples, one or more projection devices, and/or any other suitable electrical, mechanical, and/or electro-mechanical device for presenting the image, or the video, that will be apparent to those skilled in the relevant art(s) without departing the spirit and scope of the present disclosure.

In the exemplary embodiment illustrated in FIG. 7A, the audio system 706 can present the audio received from the event server 702 to the audience within the venue. From the example above, the audio system 706 can present the audio that is associated with the thunderstorm that is received from the event server 702 to the audience within the venue. Generally, the audio system 706 can include one or more auditory speakers, such as one or more super tweeters, one or more tweeters, one or more mid-range speakers, one or more woofers, one or more subwoofers, and/or one or more full-range speakers to provide some examples. In the exemplary embodiment illustrated in FIG. 7A, the audio system 706 can include one or more super tweeters/tweeters 712, one or more mid-range speakers 714, one or more woofers/subwoofers 716 to provide some examples. The one or more super tweeters/tweeters 712 deliver audio within a first audio frequency range between approximately two (2) kilohertz (kHz) and approximately twenty (20) kHz. The one or more mid-range speakers 714 deliver audio within a second audio frequency range between approximately two hundred fifty (250) Hertz (Hz) and approximately two (2) kHz. The one or more woofers/subwoofers 716 deliver audio within a third audio frequency range between approximately twenty (20) Hz and approximately two hundred fifty (250) Hz.

The audio crossover system 708 separates, or de-mixes, the audio from the event server 702 into the first audio frequency range, the second audio frequency range, and the third audio frequency range. In some embodiments, the audio crossover system 708 can include multiple filters to de-mix the audio into the first audio frequency range, the second audio frequency range, and the third audio frequency range. From the example above, the audio that is associated with the thunderstorm can include audio associated with rain falling between approximately thirteen (13) kHz and approximately twenty-five (25) kHz and audio associated with the thunder between approximately four (4) Hz and approximately one hundred twenty-five (125) Hz. In this example, the audio crossover system 708 can de-mix the audio associated with rain falling into the first audio frequency range and the audio associated with the thunder into the third audio frequency range. In some embodiments, the audio crossover system 708 can be integrated within the event server 702. As illustrated in FIG. 7A, the audio crossover system 708 delivers the audio within the first audio frequency range to the one or more super tweeters/tweeters 712, the audio within the second audio frequency range to the one or more mid-range speakers 714, and the audio within the third audio frequency range to the one or more woofers/subwoofers 716 and the portable haptic device systems 710.

In the exemplary embodiment illustrated in FIG. 7A, the portable haptic device systems 710 can generate vibrations in relation to, for example, synchronous with, the audio within the third audio frequency range in a substantially similar manner as described above in FIG. 2A through FIG. 2C. In these embodiments, the portable haptic device systems 710 can generate the vibrations to be synchronous with the lowest sounds of the audio, often referred to as bass sounds between approximately sixteen (16) Hz and approximately two hundred fifty-six (256) Hz to provide an example, within the third audio frequency range. From the example above, the portable haptic device systems 710 can generate vibrations between approximately four (4) Hertz (Hz) and approximately one hundred twenty-five (125) Hz to simulate the rumbling of audio of thunder as the audience is viewing the thunderstorm within the venue.

As illustrated in FIG. 7B, the portable haptic device systems 710 can include portable haptic device systems 720.1 through 720.1 that are communicatively coupled to a portable haptic device system controller 722. In some embodiments, the portable haptic device systems 720.1 through 720*i* can include portable haptic devices 726.1 through 726.*i* that are attached to seats 724.1 through 724.*i* in a substantially similar manner as described above in FIG. 2A through FIG. 2C and/or FIG. 3A and FIG. 3B. The portable haptic devices 726.1 through 726.*i* and the seats 724.1 through 724.*i* can represent exemplary embodiments of the portable haptic device 200 and the seat 210, respectively, as described above in FIG. 2A through FIG. 2C, the portable haptic device 302 and the wheelchair 304, respectively, as described above in FIG. 3A and FIG. 3B, and/or the portable haptic device 602 and the seat 604, respectively, as described above in FIG. 6. In some embodiments, the portable haptic device systems 720.1 through 720*i* can generate the vibrations in relation to, for example, synchronous with, the audio that is received from the audio crossover system 708 in a substantially similar manner as described above in FIG. 2A through FIG. 2C. In these embodiments, the portable haptic device systems 720.1 through 720*i* can generate the vibrations to be synchronous with the lowest sounds of the audio, often referred to as bass sounds between approximately sixteen (16) Hz and approximately two hundred fifty-six (256) Hz to provide an example. From the example above, the portable haptic device systems 720.1 through 720*i* can generate the vibrations between four (4) Hertz (Hz) and one hundred twenty-five (125) Hz to simulate the rumbling of audio of thunder as the audience is viewing the thunderstorm within the venue. Moreover, the portable haptic device systems 720.1 through 720.*i* can be mechanically and/or electrically coupled to wireline communication cables 728.1 through 728.*i* to communicatively couple the portable haptic device systems 720.1 through 720.*i* and the portable haptic device system controller 722. In some embodiments, the wireline communication cables 728.1 through 728.*i* can include one or more copper cables, such as one or more coaxial cables, one or more ribbon cables, one or more shielded cables, and/or one or more twinax cables to provide some examples. Alternatively, or in addition to, the wireline communication cables 728.1 through 728.*i* can include one or more fiberoptic cables.

The portable haptic device system controller 722 provides the audio received from the audio crossover system 708 to the portable haptic device systems 710. In some embodiments, the portable haptic device system controller 722 provides the audio within the third audio frequency range that is associated with the image, or the video. From the example above, the portable haptic device system controller 722 can provide the audio that is associated with the rumbling of audio of thunder that is received from the portable haptic device systems 710 to the portable haptic device systems 710. In these embodiments, the portable haptic device system controller 722 can provide the lowest sounds of the audio that is associated with the image, or the video, often referred to as bass sounds between approximately sixteen (16) Hz and approximately two hundred fifty-six (256) Hz to provide an example. From the example above, the portable haptic device system controller 722 can provide the audio that is associated with the audio of thunder between four (4) Hertz (Hz) and one hundred twenty-five (125) Hz to the portable haptic device systems 710 to simulate the rumbling of audio of thunder as the audience is viewing the thunderstorm within the venue. Alternatively, or in addition to, the portable haptic device system controller 722 can provide electrical power necessary to operate the portable haptic device systems 710.

In the exemplary embodiment illustrated in FIG. 7B, the portable haptic device system controller 722 can route the audio within the third audio frequency range that is associated with the image, or the video, as received from the audio crossover system 708 and/or the electrical power to the portable haptic device systems 710. As illustrated in FIG. 7B, the portable haptic device system controller 722 can be mechanically and/or electrically coupled to portable haptic device hubs 730.1 through 730.1 via wireline communication cables 732.1 through 732.*i*. In some embodiments, the wireline communication cables 732.1 through 732.*i* can include one or more copper cables, such as one or more coaxial cables, one or more ribbon cables, one or more shielded cables, and/or one or more twinax cables to provide some examples. Alternatively, or in addition to, the wireline communication cables 732.1 through 732.*i* can include one or more fiberoptic cables. The portable haptic device hubs 730.1 through 730.1 represent receptacles for mechanically and/or electrically coupling the portable haptic device systems 720.1 through 720*l* and the portable haptic device system controller 722. In some embodiments, the portable haptic device hubs 730.1 through 730*l* can be situated within, or proximate to, one or more wheelchair accessible seating locations within the venue as described above in FIG. 1. In some embodiments, the wireline communication cables 728.1 through 728.*i* can be coupled, for example, connected, to the portable haptic device hubs 730.1 through 730*l* to mechanically and/or electrically couple their corresponding portable haptic device systems 720.1 through 720*l* to the portable haptic device system controller 722. In these embodiments, the wireline communication cables 728.1 through 728.*i* can be connected to the portable haptic device hubs 730.1 through 730*l* at the start of the event. In some embodiments, the wireline communication cables 728.1 through 728.*i* can be decoupled, for example, disconnected, from the portable haptic device hubs 730.1 through 730*l* to mechanically and/or electrically decouple their corresponding portable haptic device systems 720.1 through 720.*i* from the portable haptic device system controller 722. In these embodiments, the wireline communication cables 728.1 through 728.*i* can be disconnected to the portable haptic device hubs 730.1 through 730.*i* at the conclusion of the event.

Exemplary Computer System that can be Utilized to Implement Electronic Devices within the Exemplary Venue FIG. 8 graphically illustrates a simplified block diagram of a computer system that can be utilized to implement electronic devices within the exemplary venue according to some embodiments of the present disclosure. The discussion of FIG. 8 to follow is to describe a computer system 800 that can be used to implement the portable haptic device system controller 722 as described above in FIG. 7B.

In the embodiment illustrated in FIG. 8, the computer system 800 includes one or more processors 802. In some embodiments, the one or more processors 802 can include, or can be, any of a microprocessor, graphics processing unit, or digital signal processor, and their electronic processing equivalents, such as an Application Specific Integrated Circuit ("ASIC") or Field Programmable Gate Array ("FPGA"). As used herein, the term "processor" signifies a tangible data and information processing device that physically transforms data and information, typically using a sequence transformation (also referred to as "operations"). Data and information can be physically represented by an electrical, magnetic, optical or acoustical signal that is capable of being stored, accessed, transferred, combined, compared, or otherwise manipulated by the processor. The term "processor" can signify a singular processor and multi-core systems or multi-processor arrays, including graphic processing units, digital signal processors, digital processors or combinations of these elements. The processor can be electronic, for example, comprising digital logic circuitry (for example, binary logic), or analog (for example, an operational amplifier). The processor may also operate to support performance of the relevant operations in a "cloud computing" environment or as a "software as a service" (SaaS). For example, at least some of the operations may be performed by a group of processors available at a distributed or remote system, these processors accessible via a communications network (e.g., the Internet) and via one or more software interfaces (e.g., an application program interface (API).) In some embodiments, the computer system 800 can include an operating system, such as Microsoft's Windows, Sun Microsystems's Solaris, Apple Computer's MacOs, Linux or UNIX. In some embodiments, the computer system 800 can also include a Basic Input/Output System (BIOS) and processor firmware. The operating system, BIOS and firmware are used by the one or more processors 802 to control subsystems and interfaces coupled to the one or more processors 802. In some embodiments, the one or more processors 802 can include the Pentium and Itanium from Intel, the Opteron and Athlon from Advanced Micro Devices, and the ARM processor from ARM Holdings.

As illustrated in FIG. 8, the computer system 800 can include a machine-readable medium 804. In some embodiments, the machine-readable medium 804 can further include a main random-access memory ("RAM") 806, a read only memory ("ROM") 808, and/or a file storage subsystem 810. The RAM 730 can store instructions and data during program execution and the ROM 732 can store fixed instructions. The file storage subsystem 810 provides persistent storage for program and data files, and may include a hard disk drive, a floppy disk drive along with associated removable media, a CD-ROM drive, an optical drive, a flash memory, or removable media cartridges.

The computer system 800 can further include user interface input devices 812 and user interface output devices 814. The user interface input devices 812 can include an alphanumeric keyboard, a keypad, pointing devices such as a mouse, trackball, touchpad, stylus, or graphics tablet, a scanner, a touchscreen incorporated into the display, audio input devices such as voice recognition systems or microphones, eye-gaze recognition, brainwave pattern recognition, and other types of input devices to provide some examples. The user interface input devices 812 can be connected by wire or wirelessly to the computer system 800. Generally, the user interface input devices 812 are intended to include all possible types of devices and ways to input information into the computer system 800. The user interface input devices 812 typically allow a user to identify objects, icons, text and the like that appear on some types of user interface output devices, for example, a display subsystem. The user interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other device for creating a visible image such as a virtual reality system. The display subsystem may also provide non-visual display such as via audio output or tactile output (e.g., vibrations) devices. Generally, the user interface output devices 820 are intended to include all possible types of devices and ways to output information from the computer system 800.

The computer system 800 can further include a network interface 816 to provide an interface to outside networks, including an interface to a communication network 818, and is coupled via the communication network 818 to corresponding interface devices in other computer systems or machines. The communication network 818 may comprise many interconnected computer systems, machines and communication links. These communication links may be wired links, optical links, wireless links, or any other devices for communication of information. The communication network 818 can be any suitable computer network, for example a wide area network such as the Internet, and/or a local area network such as Ethernet. The communication network 818 can be wired and/or wireless, and the communication network can use encryption and decryption methods, such as is available with a virtual private network. The communication network uses one or more communications interfaces, which can receive data from, and transmit data to, other systems. Embodiments of communications interfaces typically include an Ethernet card, a modem (e.g., telephone, satellite, cable, or ISDN), (asynchronous) digital subscriber line (DSL) unit, Firewire interface, USB interface, and the like. One or more communications protocols can be used, such as HTTP, TCP/IP, RTP/RTSP, IPX and/or UDP.

As illustrated in FIG. 8, the one or more processors 802, the machine-readable medium 804, the user interface input devices 812, the user interface output devices 814, and/or the network interface 816 can be communicatively coupled to one another using a bus subsystem 820. Although the bus subsystem 820 is shown schematically as a single bus, alternative embodiments of the bus subsystem may use multiple busses. For example, RAM-based main memory can communicate directly with file storage systems using Direct Memory Access ("DMA") systems.

CONCLUSION

The Detailed Description referred to accompanying figures to illustrate exemplary embodiments consistent with the disclosure. References in the disclosure to "an exemplary embodiment" indicates that the exemplary embodiment described can include a particular feature, structure, or characteristic, but every exemplary embodiment may not necessarily include the particular feature, structure, or characteristic. Moreover, such phrases are not necessarily referring to the same exemplary embodiment. Further, any feature, structure, or characteristic described in connection with an exemplary embodiment can be included, independently or in any combination, with features, structures, or characteristics of other exemplary embodiments whether or not explicitly described.

The Detailed Description is not meant to limiting. Rather, the scope of the disclosure is defined only in accordance with the following claims and their equivalents. It is to be appreciated that the Detailed Description section, and not the Abstract section, is intended to be used to interpret the claims. The Abstract section can set forth one or more, but not all exemplary embodiments, of the disclosure, and thus, are not intended to limit the disclosure and the following claims and their equivalents in any way.

The exemplary embodiments described within the disclosure have been provided for illustrative purposes and are not intended to be limiting. Other exemplary embodiments are possible, and modifications can be made to the exemplary embodiments while remaining within the spirit and scope of the disclosure. The disclosure has been described with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

Embodiments of the disclosure can be implemented in hardware, firmware, software application, or any combination thereof. Embodiments of the disclosure can also be implemented as instructions stored on a machine-readable medium, which can be read and executed by one or more processors. A machine-readable medium can include any mechanism for storing or transmitting information in a form readable by a machine (e.g., a computing circuitry). For example, a machine-readable medium can include non-transitory machine-readable mediums such as read only memory (ROM); random access memory (RAM); magnetic disk storage media; optical storage media; flash memory devices; and others. As another example, the machine-readable medium can include transitory machine-readable medium such as electrical, optical, acoustical, or other forms of propagated signals (e.g., carrier waves, infrared signals, digital signals, etc.). Further, firmware, software application, routines, instructions can be described herein as performing certain actions. However, it should be appreciated that such descriptions are merely for convenience and that such actions in fact result from computing devices, processors, controllers, or other devices executing the firmware, software application, routines, instructions, etc.

The Detailed Description of the exemplary embodiments fully revealed the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

What is claimed is:

1. A portable haptic device for generating vibrations in relation to audio, the portable haptic device comprising:
   a haptic device configured to generate the vibrations to be synchronous with the audio;
   a mechanical mounting assembly that is mechanically connected to the haptic device, the mechanical mounting assembly being configured to propagate the vibrations generated by the haptic device through the mechanical mounting assembly; and
   a mechanical coupling assembly that is mechanically connected to the mechanical mounting assembly, the mechanical coupling assembly being configured to:
      attach onto a seat and to be de-attached from the seat without suffering any permanent damage to the seat, and
      propagate the vibrations generated by the haptic device onto an audience member seated within the seat during the event.

2. The portable haptic device of claim 1, wherein the haptic device is configured to generate the vibrations at one or more frequencies over one or more intervals in time, and
   wherein the mechanical mounting assembly and the mechanical coupling assembly are configured to vibrate at the at one or more frequencies over the one or more intervals in time to propagate the vibrations generated by the haptic device onto the audience member.

3. The portable haptic device of claim 2, wherein the one or more frequencies comprise one or more frequencies between four Hertz (Hz) and approximately two hundred fifty-six Hz.

4. The portable haptic device of claim 1, wherein the mechanical coupling assembly is configured to:
   slide onto a back of the seat at a start of an event being hosted by a venue, and slide from the back of the seat at a conclusion of the event without suffering any permanent damage to the seat.

5. The portable haptic device of claim 4, wherein the portable haptic device and the seat form a mechanical joint that enables the mechanical coupling assembly to slide onto the back of the seat, and
wherein the mechanical coupling assembly is held to the seat by friction once the mechanical coupling assembly is slid onto the back of the seat.

6. The portable haptic device of claim 1, wherein the mechanical coupling assembly is characterized as being a "U" shape that attaches onto the seat.

7. The portable haptic device of claim 1, wherein the seat comprises a wheelchair that is situated within a wheelchair accessible seating location of a venue, and
wherein the mechanical coupling assembly is configured to de-attach from the wheelchair without suffering any permanent damage to the wheelchair.

8. The portable haptic device of claim 1, wherein the mechanical mounting assembly is mechanically connected to the haptic device using one or more one or more first mechanical fasteners,
wherein the mechanical mounting assembly is mechanically connected to the mechanical coupling assembly using one or more one or more second mechanical fasteners, and
wherein the mechanical coupling assembly is attached onto the seat without using mechanical fasteners.

9. The portable haptic device of claim 1, wherein the vibrations generated by the haptic device propagate through the mechanical mounting assembly and the mechanical coupling assembly onto the audience member.

10. A portable haptic system for generating vibrations in relation to audio that is associated with an event being hosted by a venue, the portable haptic system comprising:
a seat within the venue; and
a portable haptic device having a haptic device mechanically connected to a mechanical mounting assembly that is mechanically connected to mechanical coupling assembly, the portable haptic device being configured to:
attach the mechanical coupling assembly onto the seat at a start of the event,
propagate the vibrations generated by the portable haptic device onto an audience member seated within the seat during the event, and
de-attach the mechanical coupling assembly from the seat at a conclusion of the event without suffering any permanent damage to the seat.

11. The portable haptic system of claim 10, wherein the portable haptic device is configured to generate the vibrations at one or more frequencies over one or more intervals in time, and
wherein the mechanical mounting assembly and the mechanical coupling assembly are configured to vibrate at the at one or more frequencies over the one or more intervals in time to propagate the vibrations generated by the haptic device onto the audience member.

12. The portable haptic system of claim 11, wherein the one or more frequencies comprise one or more frequencies between four Hertz (Hz) and approximately two hundred fifty-six Hz.

13. The portable haptic system of claim 10, wherein the portable haptic device is configured to:
slide onto a back of the seat at the start of the event, and slide from the back of the seat at the conclusion of the event without suffering any permanent damage to the seat.

14. The portable haptic system of claim 13, wherein the portable haptic device and the seat form a mechanical joint that enables the mechanical coupling assembly to slide onto the back of the seat, and
wherein the mechanical coupling assembly is held to the seat by friction once the portable haptic device is slid onto the back of the seat.

15. The portable haptic system of claim 10, wherein the portable haptic device is characterized as being a "U" shape that attaches onto the seat.

16. The portable haptic system of claim 10, wherein the seat comprises a wheelchair that is situated within a wheelchair accessible seating location of the venue, and
wherein the portable haptic device is configured to de-attach from the wheelchair without suffering any permanent damage to the wheelchair.

17. The portable haptic system of claim 10, wherein the mechanical mounting assembly is mechanically connected to the haptic device using one or more one or more first mechanical fasteners,
wherein the mechanical mounting assembly is mechanically connected to the mechanical coupling assembly using one or more one or more second mechanical fasteners, and
wherein the mechanical coupling assembly is attached onto the seat without using mechanical fasteners.

18. The portable haptic system of claim 10, wherein the vibrations generated by the haptic device propagate through the mechanical mounting assembly and the mechanical coupling assembly onto the audience member.

19. A venue for hosting an event, the venue comprising:
a seat; and
a portable haptic device having a haptic device mechanically connected to a mechanical mounting assembly that is mechanically connected to mechanical coupling assembly, the portable haptic device being configured to:
attach the mechanical coupling assembly onto the seat at a start of the event,
propagate the vibrations generated by the portable haptic device to be synchronous with audio that is associated with the event onto an audience member seated within the seat during the event, and
de-attach the mechanical coupling assembly from the seat at a conclusion of the event without suffering any permanent damage to the seat.

20. The venue of claim 19, wherein the portable haptic device is configured to generate the vibrations at one or more frequencies over one or more intervals in time and
wherein the mechanical mounting assembly and the mechanical coupling assembly are configured to vibrate at the at one or more frequencies over the one or more intervals in time to propagate the vibrations generated by the haptic device onto the audience member.

21. The venue of claim 20, wherein the one or more frequencies comprise one or more frequencies between four Hertz (Hz) and approximately two hundred fifty-six Hz.

22. The venue of claim 19, wherein the portable haptic device is configured to:
slide onto a back of the seat at the start of the event, and
slide from the back of the seat at the conclusion of the event without suffering any permanent damage to the seat.

23. The venue of claim 22, wherein the portable haptic device and the seat form a mechanical joint that enables the mechanical coupling assembly to slide onto the back of the seat, and
    wherein the mechanical coupling assembly is held to the seat by friction once the mechanical coupling assembly is slid onto the back of the seat.

24. The venue of claim 19, wherein the seat comprises a wheelchair that is situated within a wheelchair accessible seating location of the venue, and
    wherein the portable haptic device is configured to de-attach from the wheelchair without suffering any permanent damage to the wheelchair.

25. The venue of claim 19, wherein the mechanical mounting assembly is mechanically connected to the haptic device using one or more one or more first mechanical fasteners,
    wherein the mechanical mounting assembly is mechanically connected to the mechanical coupling assembly using one or more one or more second mechanical fasteners, and
    wherein the mechanical coupling assembly is attached onto the seat without using mechanical fasteners.

26. The venue of claim 19, wherein the vibrations generated by the haptic device propagate through the mechanical mounting assembly and the mechanical coupling assembly onto the audience member.

\* \* \* \* \*